(12) United States Patent
Shpantzer et al.

(10) Patent No.: US 7,945,174 B2
(45) Date of Patent: May 17, 2011

(54) SECURE OPTICAL COMMUNICATIONS SYSTEM AND METHOD WITH COHERENT DETECTION

(75) Inventors: Isaac Shpantzer, Bethesda, MD (US); Nadejda Reingand, Baltimore, MD (US); Aviv Salamon, Ra'anana (IL)

(73) Assignee: CeLight, Inc., Silver Spring, MD (US)

( * ) Notice: Subject to any disclaimer, the term of this patent is extended or adjusted under 35 U.S.C. 154(b) by 565 days.

(21) Appl. No.: 12/028,121

(22) Filed: Feb. 8, 2008

(65) Prior Publication Data
US 2010/0028024 A1    Feb. 4, 2010

Related U.S. Application Data

(63) Continuation-in-part of application No. 11/610,964, filed on Dec. 14, 2006, now Pat. No. 7,397,979, which is a continuation-in-part of application No. 10/669,130, filed on Sep. 22, 2003, now Pat. No. 7,327,913, which is a continuation-in-part of application No. 10/462,834, filed on Jun. 17, 2003, now Pat. No. 7,418,209, and a continuation of application No. 09/962,243, filed on Sep. 26, 2001, now Pat. No. 7,167,651.

(51) Int. Cl.
*H04B 10/06* (2006.01)
*H04J 14/00* (2006.01)
(52) U.S. Cl. .......................................... 398/203; 398/77
(58) Field of Classification Search ..................... 398/77, 398/78, 203
See application file for complete search history.

(56) References Cited

U.S. PATENT DOCUMENTS

| | | | | |
|---|---|---|---|---|
| 4,935,940 | A  * | 6/1990 | Reindl | 375/136 |
| 5,007,106 | A  * | 4/1991 | Kahn et al. | 398/203 |
| 5,115,332 | A  * | 5/1992 | Naito et al. | 398/202 |
| 2006/0120733 | A1* | 6/2006 | Tucker et al. | 398/204 |

OTHER PUBLICATIONS

Andonovic et al.; Experimental demonstration of the (de)coding of hybrid phase and frequency codes using a pseudolocal oscillator for optical code division multiplexing, Photonics Technology Letters, IEEE, vol. 10, No. 6, pp. 887-889, Jun. 1998.*

Davis et al.; Coherent optical receiver for 680 Mbit/s using phase diversity, Electronics Letters, vol. 22, No. 1, pp. 9, Jan. 2, 1986.*

* cited by examiner

*Primary Examiner* — Nathan M Curs
(74) *Attorney, Agent, or Firm* — Nadya Reingand (57) ABSTRACT

The invention provides a system and method for secure communication that involves encoding and transmitting an optical communications signal that is encoded based on a multi-dimensional encoding technique. This technique may include at least one or more of encoding a phase, a polarization, and a frequency of the signal. Light encoding is independent from its modulation with data. The data is modulated using any format; in the preferred embodiment the QPSK format is implemented. The encoded and modulated light is transmitted through free space or via a fiber optic network to a receiver, where the information is decoded. A coherent detection based on 90-degrees or 120-degrees optical hybrid is used to decode and recover the data from the received signal. Because the encoding of the transmitted light varies according to a specific pattern or sequence, one without knowledge of the transmission encoding sequence is prevented from decoding the transmitted information.

23 Claims, 5 Drawing Sheets

SECURE OPTICAL COMMUNICATIONS SYSTEM AND METHOD WITH COHERENT DETECTION

CROSS-REFERENCE TO RELATED APPLICATIONS

This application is a continuation-in-part of Ser. Nos. 10/462,834 filed Jun. 17, 2003 and now U.S. Pat. No. 7,418,209 Ser. No. 11/610,964 filed Dec. 14, 2006 now U.S. Pat. No. 7,397,979 (which is a CIP of Ser. Nos. 10/669,130 filed Sep. 22, 2003 now U.S. Pat. No. 7,327,913 and Ser. No. 09/962,243 filed Sep. 26, 2001 now U.S. Pat. No. 7,167,651), all of which applications are fully incorporated herein by reference.

FIELD OF THE INVENTION

The invention relates to a system and method for secure data transmission using encoding techniques. More specifically, the invention relates to implementation of coherent detection to recover information from the encoded optical signal.

BACKGROUND OF THE INVENTION

Optical communications are usually either free-space systems, or systems using waveguides, such as optical fibers or the like. Typically, when the security of information being communicated by way of an optical communications system is of high importance, one or more security layers may be added to the communications signal to protect the integrity and authenticity of the data. For example, data encryption and user authentication are two security layers commonly used in today's communications networks. Data encryption techniques are often used to encode a data stream (e.g., a data stream transmitted by way of a communications signal), preventing users who do not have the proper decryption algorithm from decoding the encoded information transmitted by way of the communications network.

User authentication, on the other hand, involves procedures and/or technologies that are implemented to prevent unauthorized users from gaining access to confidential data. Although both of these techniques help maintain the integrity and authenticity of data transmitted by way of optical communications networks, they both have problems, and may not be sufficient for use in systems where the integrity, confidentiality, and/or authenticity of the data being communicated is of the utmost importance.

For example, standard data encryption algorithms can be broken by powerful computers or advanced computer algorithms. A user employing such resources could intercept encoded communications signals, record the signals, and later decode the signals. As these resources become more readily available and more powerful, the threat to maintaining the integrity and confidentiality of encoded communications signals increases.

Additionally, although user authentication procedures are often sufficient to ensure that sensitive data is secured at a receiving end of a communications link, they generally do not prevent a hostile user from intercepting communication signals while they are being transmitted. Such unauthorized interceptions of communication signals are difficult to detect, and can be accomplished by way of standard equipment that is readily available, either commercially or otherwise, to would-be data interceptors.

Accordingly, it would be desirable to provide one or more additional security layers that allow for additional security of communications signals being transmitted in a communications system or network. Specifically, it would be desirable to provide additional encryption to information being communicated by way of optical communications systems, which provides security layers that exceed the security of standard data encryption and user authentication.

SUMMARY

The present invention addresses a coherent optical receiver based on an optical hybrid. The receiver is used to recover a data transmitted via an optical link, which is a free space link or a fiber optic network. In the preferred embodiment this data is encoded using a multidimensional encoding technique and modulated using a phase shift keying format.

In the preferred embodiment the signal encoding uses a multi-dimensional encoding technique, which modifies physical characteristics of a communications signal. The multi-dimensional encoding technique may include at least one of the following: encoding the phase of an optical communications signal, encoding the polarization of an optical communications signal, and encoding the frequency of a optical communications signal, or any combination thereof.

The present invention also discloses an optical communications system that implements mentioned above coherent optical receiver. The optical signal coding is based on a sequence of codes provided to an encoder by a code unit. At the receiver side, the received signal is mixed with a local oscillator signal being encoded with the same sequence of codes. The coherent receiver performs the signals mixing in an optical hybrid, which can be a 90-degrees or 120-degrees optical hybrid.

The optical signal is modulated by data using phase shift keying or amplitude shift keying or frequency shift keying. The information is decoded using homodyne or heterodyne detection.

The present invention also discloses a method for secure data transmission based on multi-dimensional encoding technique. In one embodiment the method comprises transmitting the sequence codes to the receiver using the optical link. In another embodiment the sequence of codes is known at a receiver side before the data is transmitted. Yet another embodiment includes transmitting a key via a link being separate from the data transmission channel, the key indicative of the sequence of codes to be used for the optical signal transmitting.

BRIEF DESCRIPTION OF THE DRAWINGS

The invention is discussed below in reference to the drawings in which like parts are indicated by like reference designators.

DETAILED DESCRIPTION

To facilitate an understanding of the principles and features of the invention, it is explained hereinafter with reference to its implementation within illustrative embodiments.

According to embodiments of the invention, a system and method for secure data transmission via optical link is disclosed. Light encoding is independent from its modulation with data. Light is encrypted for security reasons using one of the encoding techniques and then modulated with the information. The light beam is transmitted, such as through free space or via a fiber optic network to a receiver, where the information is decoded. Data recovery is impossible without knowledge of the transmission encoding sequence, and it prevents the transmitted information from eavesdropping.

Figure 1:
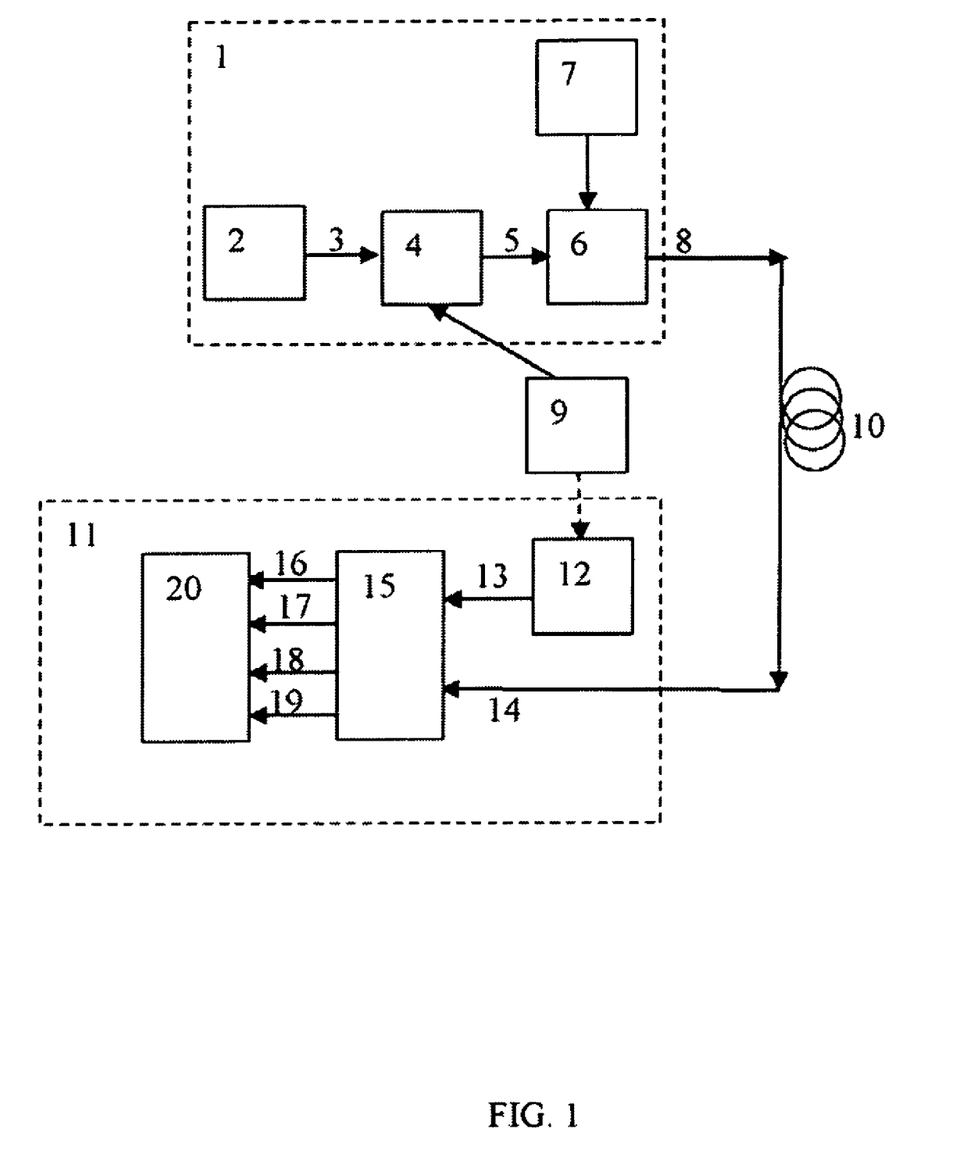
FIG. 1 illustrates a block diagram of a secured communication system, according to one or more embodiments of the invention.

Block diagram of the system according to one of the embodiments of the present invention is shown in FIG. 1. A transmitter 1 having a light source 2, which may be a laser, providing the light beam 3 that is encoded and modulated with the information. An encoder 4 varies the parameters of the light beam to prepare an encoded output beam 5 that switches between different codes as a function of time. Output beam 5 is received by a modulator 6, which modulates the beam 5 with information from a data source 7 to prepare a modulated output beam 8. The beam 8 is transmitted via an optical link 10 to the receiver side. The encoder 4 receives the digital sequence of codes from a code unit 9. The sequence of codes is also transmitted to or known in advance at the receiver side. Alternatively the sequence of codes may be transmitted via the optical channel 10; this option will be also disclosed.

In the preferred embodiment the modulator 6 is a phase modulator, which prepares an optical signal that modulates the beam using phase shift keying, binary phase shift keying or quadrature phase shift keying.

Other embodiments of the present invention transmit digital optical communications signals using amplitude-shift keying (ASK), quadrature amplitude modulation (QAM) or other appropriate format.

Referring to FIG. 1, a homodyne coherent optical receiver 11 includes a local oscillator 12 providing an oscillator beam 13 having a variable characteristics corresponding to the code from the code unit 9. The local oscillator 12 comprises any suitable light source. The oscillator beam 13 and the received signal 14 enter an optical detector unit 15. In one embodiment the optical detector unit 15 is based on 90-degrees optical hybrid, in another embodiment it is based on 120-degrees optical hybrid. The 90-degrees optical hybrid is discussed in U.S. patent application Ser. No. 11/610,964 by the same inventive entity, and also it is shown in details in FIG. 2. The output electrical signals 16-19 from the optical detector unit 15 enter a signal processing unit 20, where the transmitted data is recovered. Optionally the obtained data maybe be displayed or used for further processing.

At the receiver the received optical signal is mixed with the local oscillator signal in a coherent mixer such as an optical hybrid, and then the resulting interferometric optical signals are converted into electric currents by one or more PIN photodiodes. If the local oscillator and the received optical carrier have the same frequency, the electric currents provided by the photodiodes are baseband signals and the receiver is of the homodyne type. Respectively, if the local oscillator and the received optical carrier have different frequencies, the electric currents are shifted to the intermediate frequency (IF).

The present invention relates generally to the integrated phase diversity and polarization diversity optical receiver designated to detect the optical signal, to mix it with another optical signal, to transform the signal into electrical domain for further processing. The present invention also addresses methods of the device fabrication and use.

Optical devices currently available are based on non-integrated and/or semi-integrated solutions, i.e. optical fibers or optical fiber-based components are used for connecting of various electro-optical components and/or splitting/combining the optical signals. An integrated solution for the device that are capable to provide an arbitrary format demodulation (phase and/or amplitude modulation) is disclosed in co-pending U.S. patent application Ser. No. 11/610,964 commonly owned with the present application, both incorporated herein by references.

Figure 2:
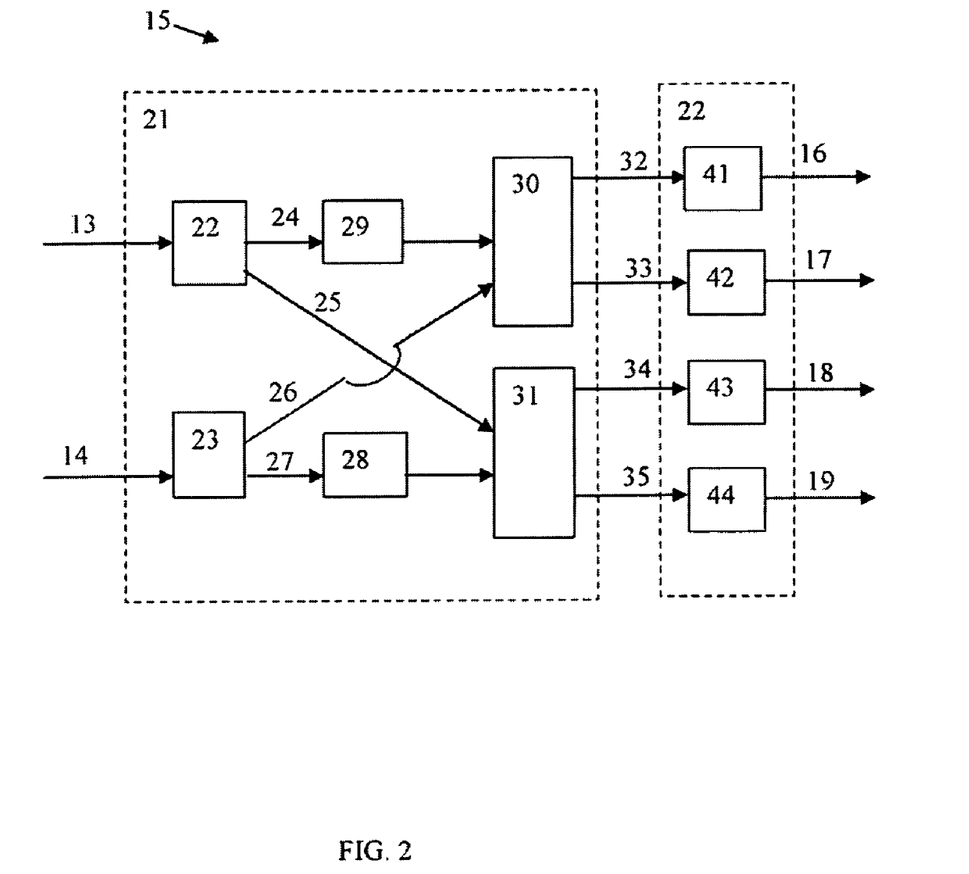
FIG. 2 shows a receiver device based on 90-degrees optical hybrid, according to one or more embodiments of the invention.

In the preferred embodiment the detector is based on 90-degrees optical hybrid, which is shown in FIG. 2. Two incoming optical signals 13 and 14, called, respectively, the signal S and the local oscillator L, impinge two inputs of the optical hybrid 21. Passive couplers or splitters 22, 23 divide the light coming from input S and L into four, preferably equal beams 24, 25, 26, and 27.

The beam 27 passes through phase shifter 28 and gains the additional phase shift. It will be appreciated that additional phase shifters 29 can be included. Additional bias can be applied to phase shifter 29 in order to obtain the desirable phase shift of 90 degrees.

Beams 24 and 26 are mixed together by directional coupler 30. Beams 25 and 27 are mixed together, respectively, at the directional coupler 31. Couplers 30 and 31 intrinsically introduce the 90-degrees phase shift between two outcoming signals. Bias voltages can be applied to each coupler 22, 23, 30 and 31 to set the 3 dB splitting operating point.

The resulting four output signals 32-35 can all have an adjustable relative phase difference with respect to each other. The first two outputs can provide the cosine of the relative phase between S and L after balanced detectors. The last two outputs can provide the sine of the relative phase.

If couplers 22, 23, 30 and 31 all are 3 dB couplers, and the single phase shift 28 provides 90-degrees phase shift, then all four outputs 32, 33, 34 and 35 have 90-degrees relative phase difference of the form:

{A=S+L, B=S−L, C=S+jL D=S−jL}.

Balanced detectors 41-44 transform the optical signals 32-35 into electrical signals 16-19. The signals 16-19 are sampled and processed in the signal processing unit 20 shown in FIG. 1.

Figure 3:
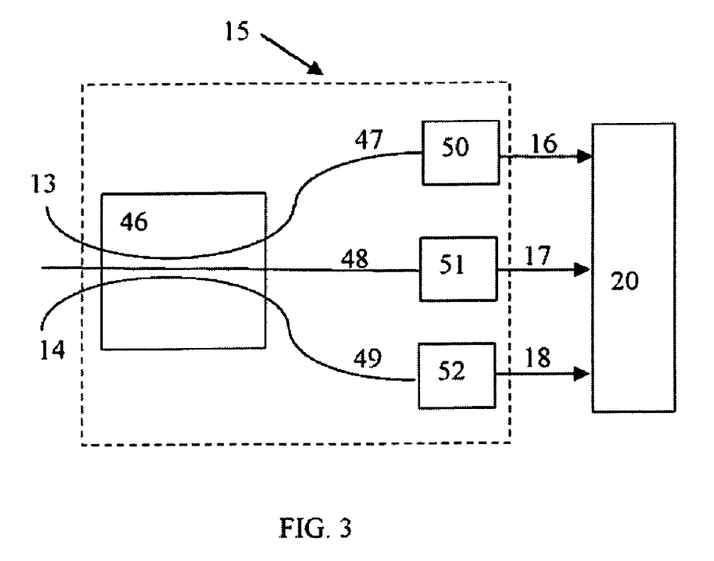
FIG. 3 shows a receiver device based on 120-degrees optical hybrid, according to one or more embodiments of the invention.

FIG. 3 depicts another embodiment of the coherent detection unit according to the present invention. This type of the detector unit is disclosed in more details in U.S. Pat. Nos. 4,732,447 by Wright and in 7,085,501 by Rickard. 120-degrees optical hybrid 46 has three inputs 13, 14, 45 and three outputs 47, 48, 49. The output signals 47-49 pass through three detector diodes 50, 51, 52 as illustrated. In the signal processing unit 20 the electrical signals 16, 17, and 18 are split into two signal paths each. Each of these six signal is mixed with a signal from a local oscillator so as to create phase differences between said six signal paths. These six signals are combined in two groups of three so as to create an in phase and a quadrature channels. The transmitted data is recovered from the in phase and quadrature signals.

The above description of the 120-degrees optical hybrid is presented as an illustration of its possible structure and performance. Obviously various modifications can be made by a person skilled in the art. The present invention is not limited to one particular example, but comprises a variety of possible embodiments.

Figure 4:
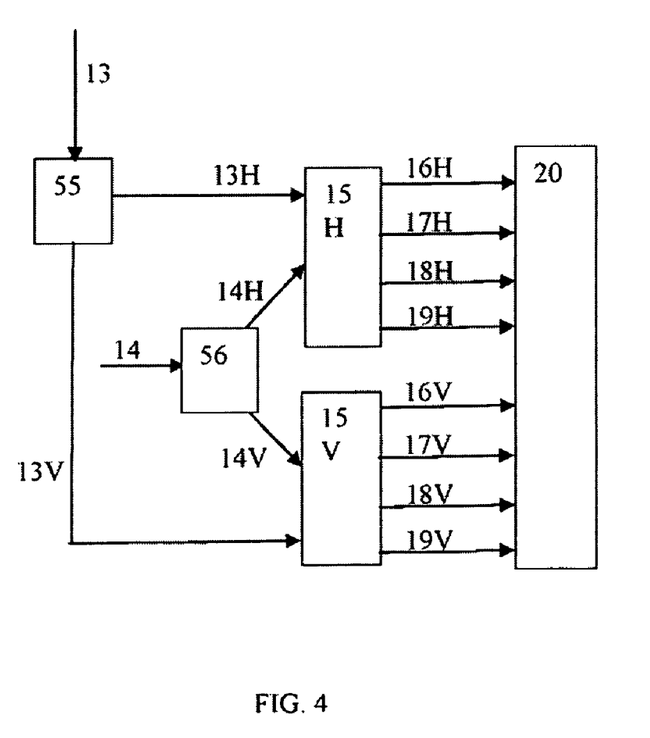
FIG. 4 shows a receiver device operating with light of two polarization states.

The system and method of the present invention are adapted to the data transmission using light in two orthogonal polarization states. FIG. 4 shows one of the embodiments of a polarization diversity receiver to operate with the light of two polarization states. In the receiver of FIG. 4 the incoming encoded and modulated light 13 is split by a polarization beam splitter 55, and the light of each polarization is decoded separately using a separate optical hybrid and a set of photodiodes. The local oscillator signal 14 is split by a polarization beam splitter 56, and the resulting beams 14H and 14 V are mixed with the optical signal of the corresponding polarization in the coherent receivers 15H and 15V. The electrical output signals from both hybrids enter the signal processing unit, where the transmitted data is recovered.

The present invention discloses a secure optical communication, which implements data modulation combined with the signal encoding or encryption. In the preferred embodiment the encoding varies in time one or more physical characteristics of the communication signal. In the preferred embodiment a multi-dimensional encoding techniques is used such as disclosed in U.S. patent application Ser. No. 10/462,834 filed Jun. 17, 2003 by the same inventive entity, this application is fully incorporate herein by reference.

The term multi-dimensional encoding, as used herein, is an encoding technique that modifies multiple physical characteristics of a communications signal. According to embodiments of the invention, multi-dimensional encoding modifies one or two or more physical characteristics of a communications signal, such as, for example a phase characteristic, a polarization characteristic, a frequency or wavelength characteristic, or other suitable characteristics.

Figure 5:
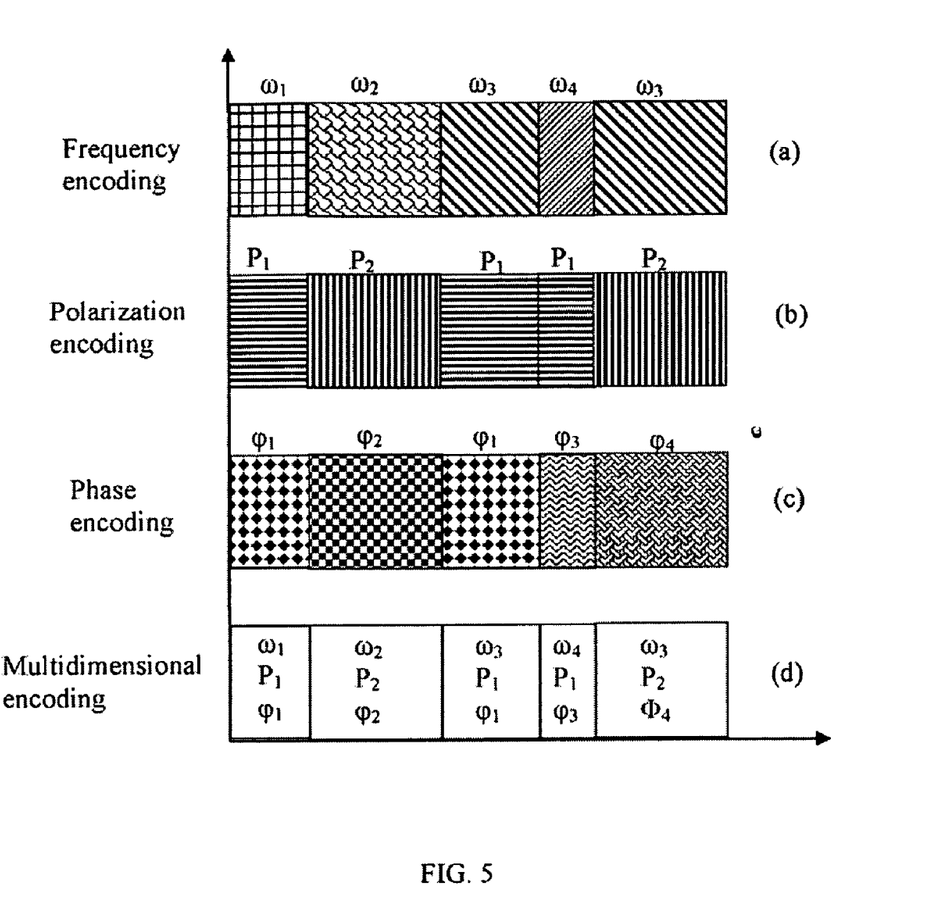
FIG. 5 illustrates a series of plots showing different exemplary encoding techniques used in the multi-dimensional encoding, according to one or more embodiments of the invention.

Various aspects of multi-dimensional encoding of a communications signal in one channel are illustrated in the examples shown in FIG. 5. Each of the plots shown in FIG. 5 illustrates a different encoding technique, whereby a communications signal is varied over time (shown on the horizontal axis) and changed in each time slot. The time slots are represented in the plots of FIG. 5 by individual rectangles along the horizontal axis. In FIG. 5, Plot (a) illustrates varying frequencies of the transmitting light or carrier signal according to a pseudo-random pattern to achieve wavelength (or frequency) encoding. Plot (b) of FIG. 5 illustrates varying the polarization state of the transmitting light or carrier signal according to a pseudo-random pattern to achieve polarization encoding. Plot (c) represents varying the phase of transmitting light according to a pseudo-random pattern to achieve phase encoding. Plot (d) represents varying multiple components of the transmitting light or carrier signal according to one or more pseudo-random patterns to achieve multidimensional encoding in accordance with embodiments of the invention. In Plot (d) shown in FIG. 5, the multidimensional encoding includes simultaneously varying of each individual characteristic varied in Plots (a)-(c) according to a pseudo-random pattern. The encoding techniques of each of the plots shown in FIG. 4 are described in greater detail below.

Plot (a) of FIG. 5 illustrates varying frequencies of the transmitting light or carrier signal according to a pseudo-random pattern to achieve wavelength (or frequency) encoding. Although four frequencies are shown in Plot (a), more or fewer frequencies can be used depending upon the desired results and/or design requirements of the system. This encoding provides a certain level of security by itself, and can be used in multi-dimensional encoding techniques according to embodiments of the invention. Polarization multiplexing (or polarization state encoding) can also be used to encode the carrier signal by changing the polarization states of the carrier signal according to a pseudo-random pattern, as shown in Plot (b) of FIG. 5. For example, in an optical system, the optical communications signal can be separated into two orthogonal polarizations (e.g., a vertical component and a horizontal component, or a clockwise component and a counter-clockwise component), and the signal may be transmitted with the polarization state changing in time. A polarization multiplexing technique allows for added security, because eavesdroppers attempting to intercept communications multiplexed in such a manner are unable to decipher or decode the information without knowing the pre-determined pattern of the polarization change sequence. Multi-dimensional encoding techniques according to embodiments of the invention may make use of phase encoding, such as the phase encoding shown in Plot (c) of FIG. 5. In systems using coherent optical communications signals and coherent detection at a receiver, a transmitter can encode the phase of the carrier communications signal by introducing additional phase shift in a predetermined manner thus adding an additional dimension of security. An example of changing the phase of a carrier signal according to a predetermined, pseudo-random pattern is shown in Plot (c) of FIG. 5, where the phase of the carrier signal is varied among multiple phases. Although the example shown in Plot (c) shows the carrier signal being varied between four phases, more or fewer phases could be used depending upon the desired application and any design requirements. The polarization, phase and frequency encoding can be used separately and in combination to form a multi-dimensional encoding technique in accordance with embodiments of the invention.

One example of a multi-dimensional encoding technique that makes use of all of the encoding techniques shown in Plots (a)-(c) of FIG. 5 is shown in Plot (d). In Plot (d), a carrier signal is encoded according to three independent encoding techniques: frequency encoding, polarization state encoding and phase encoding. Each of the encoding techniques that contributes to the multi-dimensional encoding is independently varied according to an independent pseudo-random pattern. Thus, the frequency is varied as shown in Plot (a), while at the same time the polarization and phase are independently varied as shown in Plots (b) and (c), respectively. Although the multi-dimensional encoding shown in Plot (d) of FIG. 5 uses the encoding techniques from Plots (a)-(c), multi-dimensional encoding techniques according to other embodiments of the invention can make use of more or fewer contributing encoding techniques. For example, a combination of any two encoding techniques from Plots (a)-(c) could form suitable multi-dimensional encoding according to embodiments of the invention.

Figure 6:
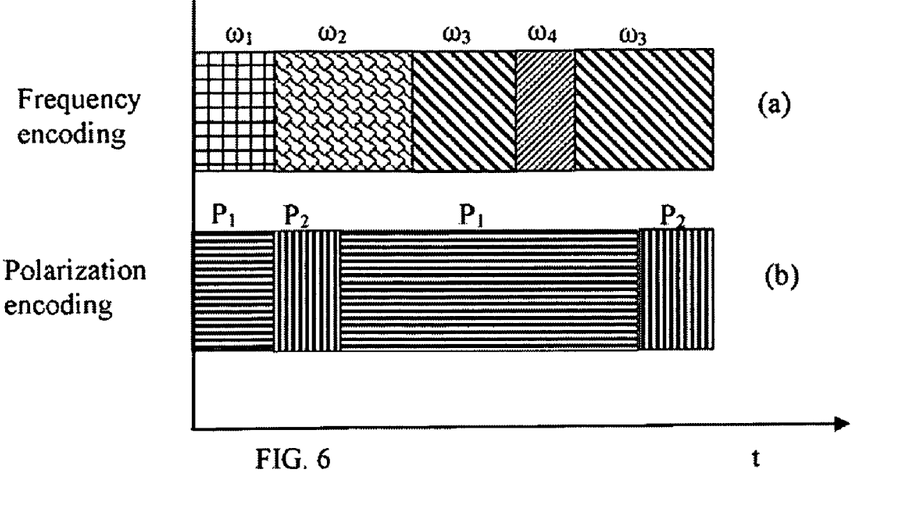
FIG. 6 illustrates a series of plots showing different exemplary encoding techniques used in the multi-dimensional encoding, where the sequence of the physical parameter change is different for the different parameters.

FIG. 6 demonstrates the case when two different physical parameters are changes when the data is transmitted. The sequence in time of the parameters change may be different for different parameters. In FIG. 6 the sequence of changing the frequency of the optical signal does not coincide with the sequence of changing its polarization state.

Figure 7:
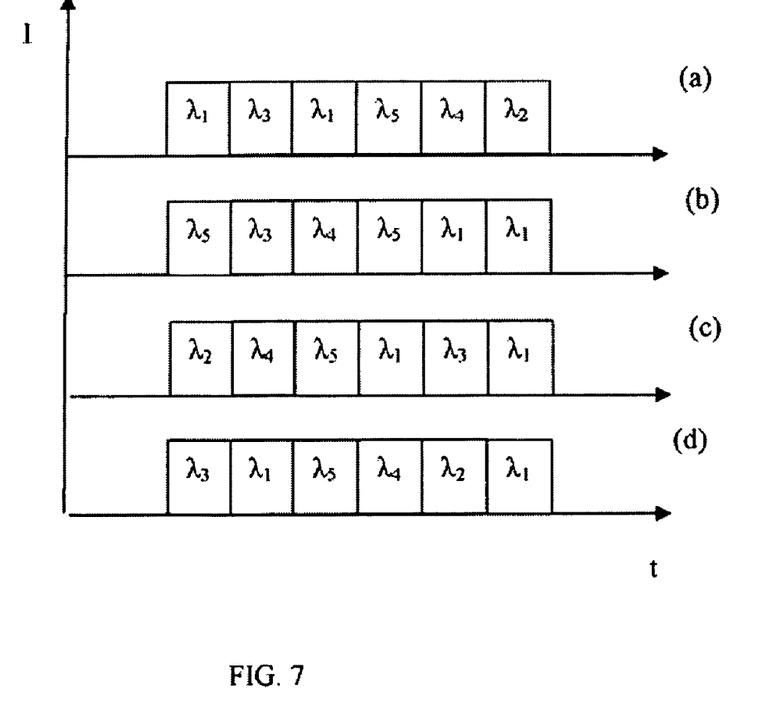
FIG. 7 illustrates a series of plots showing different examples of wavelength pseudo-random patterns for multi-dimensional encoding techniques, according to one or more embodiments of the invention.

There is variety of algorithms how to change one pseudo-random with another in time. FIG. 7 illustrates some of them using frequency encoding technique. The same approach can be applied to the polarization and phase encodings or any sequence of codes. Plot (a) of FIG. 7 shows an example of varying frequency (or wavelength) according to a predetermined, pseudo-random pattern. Such a pseudo-random pattern can be, for example, defined using a pool of hundreds of wavelengths across a transmission band. The plots of FIG. 7 illustrate various examples of wavelength (or frequency) predetermined, pseudo-random patterns that can be used in a multi-wavelength control technique, which as discussed above, can form a part of a multi-dimensional encoding technique according to various embodiments of the invention.

The number of wavelengths shown in Plots (a)-(d) of FIG. 7 is limited due to space constraints; however, any number of different wavelengths can be substituted for the pseudo-random patterns shown, and can be used in a multi-wavelength control technique, which may be used to form part of a multi-dimensional encoding technique according to embodiments of the invention. At the end of pseudo-random pattern, the sequence can resume again, starting from the first element of the same pseudo-random pattern. According to embodiments of the invention, the pseudo-random pattern can be changed from the previous pseudo-random pattern, rather than repeating patterns, to provide an additional security layer.

Plot (a) of FIG. 7 shows an initial wavelength pre-determined pseudo-random pattern. This wavelength pattern represents a series of wavelengths to be transmitted as a communications signal, whose wavelength is to be varied according to the pattern shown; from a transmitter to a receiver. Plots (b), (c), and (d) in FIG. 7 show other various pseudo-random patterns that can follow the initial pseudo-random pattern shown in Plot (a), according to different switching algorithms used in the multi-wavelength control technique. The switching algorithms will be discussed below in greater detail.

Plot (b) of FIG. 7 represents a pseudo-random pattern that is unrelated to the initial pseudo-random pattern shown in Plot (a). Using the switching algorithm that produced the wavelength pattern shown in Plot (b), a number of independent, unrelated, pseudo-random patterns can be created sequentially, and may provide an additional level of security because of the apparent high level of randomness in the transmission sequence.

Plot (c) of FIG. 7 represents a pseudo-random pattern of wavelengths that is reversed from the original (i.e., the initial pattern shown in Plot (a)). Thus, if the sequence shown in Plot (a) is an original pseudo-random pattern, Plot (c) illustrates the reverse of this original pseudo-random pattern, and immediately follows the pseudo-random pattern shown in Plot (a). The switching algorithm that produces the pattern of Plot (c) is based upon the previous pattern, and is, therefore, inherently less random than the switching algorithm used to create the pattern of Plot (b). The switching algorithm of Plot (c), however, is suitable for many applications, and may even be preferred for some uses.

Plot (d) of FIG. 7 represents a shifted pseudo-random pattern, which shifts the sequence of wavelengths in the initial pattern shown in Plot (a) by one position to the left. Switching algorithms similar to the algorithm used to create the wavelength pattern of Plot (d) can be used to shift the position of wavelengths in a particular pattern by any number of shifted positions from the original sequence. The switching algorithm used to generate the sequence shown in Plot (d) is inherently less random than the switching algorithm used to create the pattern of Plot (b), as it is based upon the prior sequence. The switching algorithm of Plot (d), however, is suitable for many applications, and may even be preferred for some uses.

Plots (a)-(d) only represent a number of examples of pseudo-random patterns for use with frequency (or wavelength) encoding. In addition to the exemplary pseudo-random patterns shown in Plots (a)-(d) of FIG. 7, any number of pseudo-random patterns can be used in accordance with various embodiments of the invention. Moreover, the pseudo-random patterns shown in Plots (a)-(d) of FIG. 7, as well as any other suitable pseudo-random patterns, can be used with other types of encoding used in a multi-dimensional encoding technique according to one or more embodiments of the invention. Thus, similar pseudo-random patterns can be introduced into polarization state encoding, phase encoding, or any other encoding technique used in a multi-dimensional encoding schema according to embodiments of the invention.

Various switching algorithms can be used to notify the receiver that the pseudo-random pattern to be transmitted is either being changed form or remains the same as an original pseudo-random pattern. This is applicable to all kinds of the pseudo-random patterns, including patterns used to encode wavelength, polarization, phase, and other codes. According to various embodiments of the invention the system can have a pre-defined sequence of pseudo-random patterns that are built into the receiver. While having such a pre-defined sequence of patterns would not provide the same kind of randomness and security afforded by changing patterns during communications, it may be sufficient and even desirable for some applications. According to other embodiments of the invention designed to further enhance the security level of the communications system, a key distribution schema can be used to distribute an encoding key indicating the pattern of controlling and varying the various parameters of the data signal (e.g., transmitter wavelength or frequency, phase shift coding, polarization multiplexing, etc.). This key can, for example, be transmitted via a separate, secured channel. Many examples of such a separate, secured channel are known and would provide suitable security for transmitting the key. For example, according to an embodiment of the invention, quantum encryption could be used to provide such a separate, secure channel for transmitting the multi-dimensional key. Alternatively, other forms of key transmission could be used in connection with other embodiments of the invention.

A method of optical secure communication is another object of the present invention. The method comprises encoding an optical signal and a local oscillator with the same sequence of codes; modulating the optical signal with a data; transmitting the optical signal to a coherent receiver via an optical link; receiving the encoded signal; mixing the signal with the local oscillator signal in an optical hybrid; and recovering a transmitted data. The optical hybrid is a 90-degrees optical hybrid or a 120-degrees optical hybrid. In the preferred embodiment the method implements modulating the optical signal with data using a phase shift keying format. The method further comprises transmitting the sequence codes to the receiver using the optical link.

In one embodiment the sequence of codes is known at a receiver side before the data is transmitted. In another embodiment the information about the sequence codes change is transmitted to the receiver using the optical link. In yet another embodiment, a key is transmitted via a link being separate from the data transmission channel, the key indicative of the sequence of codes to be used for the optical signal transmitting.

According to various embodiments of the invention, the multi-dimensional encoding techniques can be combined with other types of encoding. It may provide additional encoding, or added security, using, for example, one or more of the following techniques: optical phase shift coding, polarization multiplexing, and dynamic multi-wavelength control. Additionally, other parameters and/or techniques may be combined with the techniques mentioned above to provide additional security in multi-dimensional encoding of optical communications signals.

According to embodiments of the invention, one or more communications channels can be used to communicate signals encoded using to a multi-dimensional encoding technique according to embodiments of the invention. For example, multiple channels that are each encoded using multi-dimensional encoding technique may be simultaneously communicated from the transmitter to the receiver.

While the above invention has been described with reference to specific embodiments, these embodiments are intended to be illustrative and not restrictive. The scope of the invention is indicated by the claims below, and all changes that come within the meaning and range of equivalents thereof are intended to be embraced therein.

What is claimed is:

1. An apparatus for receiving encoded data, comprising:
a coherent optical receiver configured to receive an encoded signal and to mix it with a signal from a local oscillator, the local oscillator being a separate device from a source device generating the encoded signal;
the encoded signal and the local oscillator being encoded with the same sequence of codes; wherein the receiver is based on an optical hybrid and wherein the encoded signal is modulated with data using at least one of quadrature phase shift keying format or quadrature amplitude shift keying format.

2. The apparatus of claim 1, wherein the optical hybrid is a 90-degrees optical hybrid with a set of two pairs of balanced photodetectors.

3. The apparatus of claim 2, wherein the 90-degrees optical hybrid comprising: a first coupler coupled to a first input and producing at least a first and second output; a second coupler coupled to a second input and producing at least a first and second output; a third coupler coupled to the first output of the first coupler and to the first output of the second coupler;
a fourth coupler coupled to the second output of the first coupler and to the second output of the second coupler; the second output of the first coupler and the first output of the second coupler forming first and second crossing waveguides with an angle selected to minimize crosstalk and losses between the first and second cross waveguides, and a first phase shifter coupled to the first waveguide.

4. The apparatus of claim 3, further comprising a second phase shifter coupled to the second waveguide.

5. The apparatus of claim 1, wherein the optical hybrid is a 120-degrees optical hybrid.

6. The apparatus of claim 1, wherein the sequence of codes uses a multi-dimensional encoding technique, which is at least partially based on at least one of: a polarization change sequence of a communications signal; and a frequency change sequence of a communications signal.

7. The apparatus of claim 1, wherein the optical hybrid is an integrated device made of an electro-optical material or thermo-optical material or a combination of thereof.

8. The apparatus of claim 1, wherein the optical hybrid is formed as part of a single planar chip made of a semiconductor material or a ferroelectric material or a combination of thereof.

9. An apparatus for receiving encoded data, comprising:
a coherent optical receiver configured to receive an encoded signal and to mix it with a signal from a local oscillator, the local oscillator being a separate device from a source device generating the encoded signal;
the encoded signal and the local oscillator being encoded with the same sequence of codes;
wherein the receiver is based on an optical hybrid and
wherein the sequence of codes uses a multi-dimensional encoding technique, and wherein the multi-dimensional encoding technique is based on changing both a polarization sequence and a frequency sequence of the communications signal.

10. The apparatus of claim 9, wherein a time slot for one encoding is different from a time slot for another encoding.

11. An apparatus for receiving encoded data, comprising:
a coherent optical receiver configured to receive an encoded signal and to mix it with a signal from a local oscillator, the local oscillator being a separate device from a source device generating the encoded signal;
the encoded signal and the local oscillator being encoded with the same sequence of codes;
wherein the receiver is based on an optical hybrid and
wherein the coherent optical receiver consists of two 90-degrees optical hybrids, one for H-polarization and one for V polarization and is adapted for operation with the optical signal of two polarization states.

12. A system for secure data transmission via an optical communication link, comprising: a light source generating an optical beam, the optical beam being encoded in an encoder, modulated with the data in a modulator and transmitted via the optical link; a coherent receiver receiving the encoded modulated optical beam, the receiver mixing the received beam with a local oscillator beam coming from a local oscillator generator, the local oscillator beam being encoded with the same sequence of codes as the received beam;
wherein the coherent receiver is based on an optical hybrid and
wherein the modulator modulates the optical beam using a quadrature phase shift keying format.

13. The system of claim 12, wherein the optical hybrid is a 90-degrees or 120-degrees optical hybrid.

14. The system of claim 12, wherein the optical link is a fiber or a free space link.

15. The system of claim 12, wherein the encoder provides the optical beam encoding using a multi-dimensional encoding technique based on at least one of: a polarization change sequence of a communications signal; and a frequency change sequence of a communications signal.

16. The system of claim 12, further comprising a code unit for supplying a code sequence to the encoder and the local oscillator generator.

17. A method of optical secure communication, comprising encoding an optical signal and a local oscillator beam with the same sequence of codes; the local oscillator beam being generated by a local oscillator generator at the receiver side; modulating the optical signal with a data using a quadrature phase shift keying format; transmitting the optical signal to a coherent receiver via an optical link; receiving the encoded signal, mixing the signal with the local oscillator signal in an optical hybrid; and recovering a transmitted data.

18. The method of claim 17, wherein the optical hybrid is a 90-degrees optical hybrid with two pairs of balanced photodetectors.

19. The method of claim 17, wherein the optical hybrid is a 120-degrees optical hybrid.

20. The method of claim 17, wherein the sequence of codes is known at a receiver side before the data is transmitted.

21. The method of claim 17, further comprising: transmitting a key for the sequence codes change to the receiver using the optical link.

22. A method of optical secure communication, comprising encoding an optical signal and a local oscillator beam with the same sequence of codes; the local oscillator beam being generated by a local oscillator generator at the receiver side; modulating the optical signal with a data; transmitting the optical signal to a coherent receiver via an optical link; transmitting the sequence codes to the receiver using the optical link using a separate beam than the encoded signal; receiving the encoded signal, mixing the signal with the local oscillator signal in an optical hybrid; and recovering a transmitted data.

23. A method of optical secure communication, comprising encoding an optical signal and a local oscillator beam with the same sequence of codes; the local oscillator beam being generated by a local oscillator generator at the receiver side; modulating the optical signal with a data; transmitting a key via a link being separate from the data transmission channel and local oscillator channel, the key indicative of the sequence of codes to be used for the optical signal transmitting; transmitting the optical signal to a coherent receiver via an optical link; receiving the encoded signal, mixing the signal with the local oscillator signal in an optical hybrid; and recovering a transmitted data.

\* \* \* \* \*